(12) United States Patent
Watanabe et al.

(10) Patent No.: US 10,837,527 B2
(45) Date of Patent: Nov. 17, 2020

(54) TENSIONER

(71) Applicant: TSUBAKIMOTO CHAIN CO., Osaka (JP)

(72) Inventors: Masanori Watanabe, Osaka (JP); Yudai Takagi, Osaka (JP); Osamu Yoshida, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 357 days.

(21) Appl. No.: 16/044,728

(22) Filed: Jul. 25, 2018

(65) Prior Publication Data

US 2019/0063562 A1    Feb. 28, 2019

(30) Foreign Application Priority Data

Aug. 23, 2017   (JP) ................................. 2017-160033

(51) Int. Cl.
F16H 7/08    (2006.01)

(52) U.S. Cl.
CPC ... F16H 7/0831 (2013.01); *F16H 2007/0806* (2013.01); *F16H 2007/0812* (2013.01); *F16H 2007/0891* (2013.01)

(58) Field of Classification Search
CPC ..... F16H 2007/0806; F16H 2007/0812; F16H 2007/0859; F16H 2007/0814; F16H 7/0836
USPC ....................................................... 474/110
See application file for complete search history.

(56) References Cited

U.S. PATENT DOCUMENTS

| | | | | |
|---|---|---|---|---|
| 6,398,682 | B1 * | 6/2002 | Suzuki | F16H 7/08 474/110 |
| 6,810,907 | B2 * | 11/2004 | Hashimoto | F16H 7/0848 137/514.5 |
| 8,574,106 | B2 * | 11/2013 | Botez | F16H 7/0848 474/110 |
| 8,574,107 | B2 * | 11/2013 | Nakano | F16H 7/0836 474/110 |
| 8,585,519 | B2 * | 11/2013 | Hartmann | F16H 7/0836 474/110 |

(Continued)

FOREIGN PATENT DOCUMENTS

| | | |
|---|---|---|
| JP | 2001-12569 A | 1/2001 |
| JP | 3962052 B2 | 8/2007 |

(Continued)

*Primary Examiner* — Henry Y Liu
(74) *Attorney, Agent, or Firm* — Westerman, Hattori, Daniels & Adrian, LLP (57) ABSTRACT

To provide a tensioner capable of keeping, with a simple structure, oil pressure in an oil pressure chamber stable. The tensioner includes a pressure adjusting mechanism that adjusts oil pressure in the oil pressure chamber. The pressure adjusting mechanism includes a cylinder part, a piston unit set inside the cylinder part so as to be able to approach and separate from the oil pressure chamber, and piston biasing units that bias the piston unit toward the oil pressure chamber. A liquid tight seal condition is kept between the cylinder part and the piston unit at any position between a position where the piston unit has moved closest to the oil pressure chamber and a position where the piston unit has moved closest to the adjustment space. The piston biasing units include at least two piston springs.

5 Claims, 6 Drawing Sheets

(56) References Cited

U.S. PATENT DOCUMENTS

| | | | |
|---|---|---|---|
| 10,738,860 B2 * | 8/2020 | Wigsten | F16H 7/08 |
| 10,753,433 B2 * | 8/2020 | Watanabe | F16H 7/14 |
| 2002/0052259 A1 * | 5/2002 | Nakakubo | F16H 7/0848 |
| | | | 474/109 |
| 2006/0094549 A1 * | 5/2006 | Yoshida | F16H 7/0836 |
| | | | 474/110 |
| 2011/0256970 A1 * | 10/2011 | Nakano | F16H 7/0836 |
| | | | 474/110 |
| 2014/0187367 A1 * | 7/2014 | Todd | F16H 7/0848 |
| | | | 474/110 |
| 2015/0024887 A1 * | 1/2015 | Oh | F16H 7/08 |
| | | | 474/110 |
| 2016/0033016 A1 * | 2/2016 | Todd | F02B 67/06 |
| | | | 474/111 |

FOREIGN PATENT DOCUMENTS

| | | |
|---|---|---|
| KR | 100473208 B1 | 3/2005 |
| KR | 10-2015-0126628 A | 11/2015 |

* cited by examiner

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension in a chain or the like. For example, a known chain guide mechanism uses a tensioner to bias a tensioner lever for slidably guiding a drive chain, such as an endless toller chain passing over respective sprockets of a crankshaft and a cam shaft inside an engine room, to maintain appropriate tension of the chain or the like.

Figure 6:
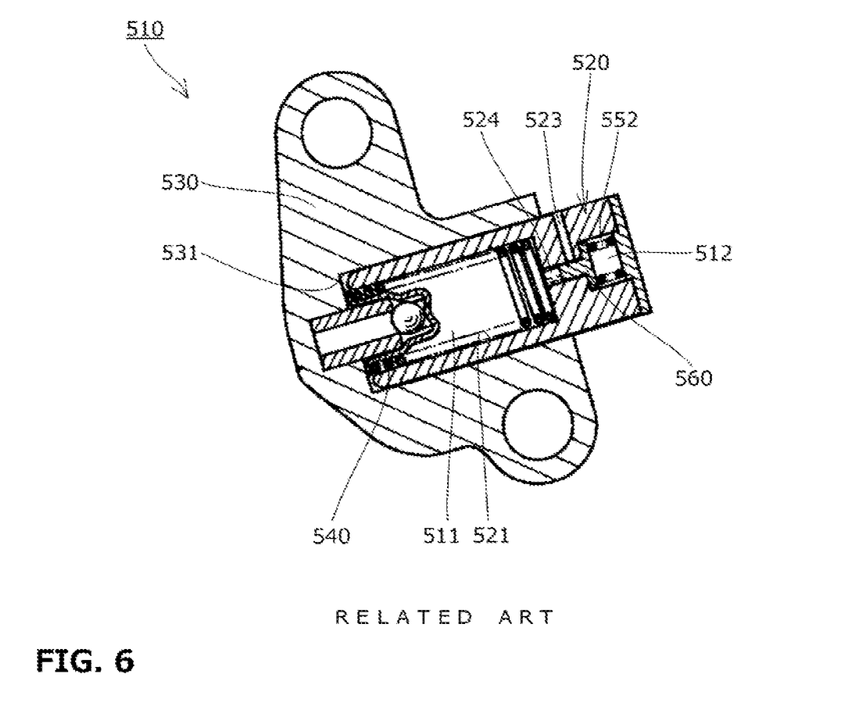
FIG. 6 is a cross-sectional view illustrating a tensioner of related art.

One known tensioner 510 used in such a chain guide mechanism includes, as shown in FIG. 6, a plunger 520 having a plunger hole 521 that is open on the rear side, a housing 530 having a plunger accommodating hole 531 that is open on the front side for accommodating the plunger 520, a relief valve mechanism that releases oil in an oil pressure chamber 511 to the outside of the plunger 520 when oil pressure in the oil pressure chamber 511 builds up, and a main spring 540 accommodated in the oil pressure chamber 511 formed between the plunger 520 and the plunger accommodating hole 531 so as to be able to expand and contract and to urge the plunger 520 toward the front side (see, for example, Japanese Patent Application Laid-open No. 2001-12569).

In this tensioner 510 described in Japanese Patent Application Laid-open No. 2001-12569, a pressure passage 524 in communication with the oil pressure chamber 511, a discharge hole 523 that connects the pressure passage 524 with the outside of the plunger 520, and a spring accommodating space 512 formed on the front side of the pressure passage 524, are formed at the bottom of the plunger 520. The relief valve mechanism is made up of a valve member 560 slidably fitted in the pressure passage 524, and a relief spring 552 set inside the spring accommodating space 512 to urge the valve member 560 toward the oil pressure chamber 511.

In this tensioner 510, when the oil pressure in the oil pressure chamber 511 rises, the valve member 560 moves forward against the urging force of the relief spring 552 so that the pressure passage 524 communicates with the discharge hole 523 and the oil is released from the discharge hole 523.

SUMMARY OF THE INVENTION

One problem with such a tensioner 510 was that the oil pressure in the oil pressure chamber 511 sometimes varied largely due to fluctuations in the force the plunger 520 received from the chain, or the variation in the amount of oil supplied to the oil pressure chamber 511. The tensioner 510 described in Japanese Patent Application Laid-open No. 2001-12569 could assume only two positions, i.e., one where the valve member 560 blocks the pressure passage 524 to stop release of oil to the outside of the plunger 520, and the other where the valve member 560 is moved forward by the oil pressure from the oil pressure chamber 511 to allow the oil to be released from the discharge hole 523 to the outside of the plunger 520, because of which it was difficult to keep the oil pressure in the oil pressure chamber 511 stable.

With the relief valve mechanism of Japanese Patent Application Laid-open no. 2001-12569, when the oil pressure in the oil pressure chamber 511 rises, part of the oil supplied from the hydraulic power source such as an oil pump is released to the outside. This leads to a larger amount of oil consumption and necessitates higher power capacity of the hydraulic power source.

The present invention solves these problems and it is an object of the invention to provide a tensioner that can keep, with a simple structure, the oil pressure inside an oil pressure chamber stable.

The present invention solves the problems described above by providing a tensioner including a plunger having a plunger hole that is open on a rear side, a housing having a plunger accommodating hole that is open on a front side and accommodates the plunger, a biasing unit accommodated inside an oil pressure chamber formed between the plunger and the plunger accommodating hole so as to be able to expand and contract and to urge the plunger toward the front side, and a pressure adjusting mechanism adjusting the oil pressure in the oil pressure chamber. The pressure adjusting mechanism includes a cylinder part, a piston unit set inside the cylinder part so as to be able to approach and separate from the oil pressure chamber and partitioning a space formed between the plunger and the housing into the oil pressure chamber and an adjustment space, and a piston biasing unit biasing the piston unit toward the oil pressure chamber. A liquid tight seal condition is kept between the cylinder part and the piston unit anywhere between a position where the piston unit has moved closest to the oil pressure chamber and a position where the piston unit has moved closest to the adjustment space. The piston biasing unit includes at least two piston springs.

According to one aspect of the present invention, the pressure adjusting mechanism that adjusts the oil pressure in the oil pressure chamber includes a cylinder part, a piston unit set inside the cylinder part so as to be able to approach and separate from the oil pressure chamber and partitioning a space formed between the plunger and the housing into the oil pressure chamber and an adjustment space, and a piston biasing unit that biases the piston unit toward the oil pressure chamber, a liquid tight seal condition being kept between the cylinder part and the piston unit anywhere between a position where the piston unit has moved closest to the oil pressure chamber and a position where the piston unit has moved closest to the adjustment space.

When the oil pressure in the oil pressure chamber builds up, the piston unit moves away from the oil pressure chamber. As the volume of the oil pressure chamber increases in accordance with the moving amount of the piston unit, the pressing force of the plunger applied to the chain can be gradually reduced. Thus the oil pressure in the oil pressure chamber and the pressing force of the plunger can be made stable with a simple structure.

Release of part of oil to the outside as would occur in a conventional tensioner provided with a relief valve mechanism can be avoided, so that the oil consumption is reduced, which contributes to reduction of power required for the hydraulic power source. Also, since gradual leakage of oil from the oil pressure chamber to the outside when the engine is stopped during which no oil is supplied to the tensioner can be avoided, the amount of oil in the oil pressure chamber can be maintained over a long period of time, and failures such as abnormal noise when the engine is restarted can be prevented.

The piston biasing unit that biases the piston unit toward the oil pressure chamber includes at least two piston springs, which enables favorable adjustment of the biasing force that acts on the piston unit when the piston unit is move toward the adjustment space, to make the oil pressure inside the oil pressure chamber and the pressing force of the plunger stable, as well as enables highly accurate setting of pressure for pressing the piston unit toward the oil pressure chamber.

Namely, with the piston biasing unit including two piston springs, the length and the like of each piston spring can be adjusted such that the piston springs partially starts to apply a biasing force at a halfway point of the movement path of the piston unit toward the adjustment space. This way, the biasing force applied to the piston unit can be adjusted favorably.

The piston biasing unit may also be configured such that a given pressure is applied to the piston unit by only the part of the piston springs, which makes it possible to set a smaller total sum of spring constants of the piston springs for applying pressure to the piston unit. Errors in the pressure value resulting from dimensional errors or the like of piston springs can thereby be minimized, and the pressure for pressing the piston unit can be set accurately.

According to another aspect of the present invention, the second piston spring is disposed radially inside the first piston spring. This minimizes the installation space of the piston biasing unit as well as enables the piston unit to be biased toward the oil pressure chamber uniformly.

According to another aspect of the present invention, the pressure adjusting mechanism includes a first restricting part that restricts the movement of the piston unit toward the adjustment space. Limiting the moving range of the piston unit enables reduction of production costs because the dimension in the piston moving direction of the cylinder inner circumferential surface, which needs to be machined precisely, can be made shorter. The first restricting part is formed by a tubular restricting sleeve arranged radially outside the first piston spring. This minimizes the installation space of the pressure adjusting mechanism, as well as ensures that the piston unit is restricted from moving toward the adjustment space.

According to another aspect of the present invention, the piston unit is formed of a component having a tubular piston body set inside the cylinder part, a bottom part formed at one end of the piston body on the oil pressure chamber side, and a flange part formed at one end of the piston body on the adjustment space side. The first piston spring is arranged to abut on a side face of the flange part on the adjustment space side, and the second piston spring is arranged such that one end thereof is inserted in the piston body to abut on a side face of the bottom part on the adjustment space side. This way, the piston unit can be biased by the first piston spring and the second piston spring at positions displaced in the piston moving direction and in the radial direction, so that the piston unit can be maintained in a favorable orientation, and the liquid tight seal condition between the cylinder part and the piston unit can be kept reliably.

According to another aspect of the present invention, an annular protrusion projecting radially inward from an inner circumferential wall of the plunger hole includes a large-diameter hole open on the adjustment space side and a small-diameter hole open on the oil pressure chamber side. The piston body is arranged inside the large-diameter hole. An inner circumferential surface of the large-diameter hole functions as a cylinder inner circumferential surface of the cylinder part. A stepped portion between the large-diameter hole and the small-diameter hole functions as a restricting part positioned at the bottom part on the oil pressure chamber side to restrict the movement of the piston unit. A side face of the annular protrusion on the adjustment space side functions as a restricting part positioned at the flange part on the oil pressure chamber side to restrict the movement of the piston unit.

This way, the piston unit can be restricted from moving toward the oil pressure chamber at positions displaced in the piston moving direction and in the radial direction, so that the orientation of the piston unit when pressed by the piston springs against the restricting part can be maintained favorably, and the liquid tight seal condition between the cylinder part and the piston unit can be kept reliably.

A seal can also be provided between the flange part and a side face of the annular protrusion on the adjustment space side, so that oil flow from the oil pressure chamber to the adjustment space when the piston unit is pressed against the restricting part can be prevented reliably.

Since the pressure adjusting mechanism includes a restricting part that restricts the movement of the piston unit toward the oil pressure chamber, the range of movement of the piston unit is limited, so that the length of the cylinder inner circumferential surface, which needs precise machining, along the moving direction of the piston can be reduced. This enables a reduction in the production cost. Also, during assembly, the restricting part can be utilized as a portion for determining the position of the piston unit, so that the assembling cost can be reduced.

DESCRIPTION OF THE PREFERRED EMBODIMENT

A tensioner 10 according to one embodiment of the present invention will be described below with reference to the drawings.

Figure 1:
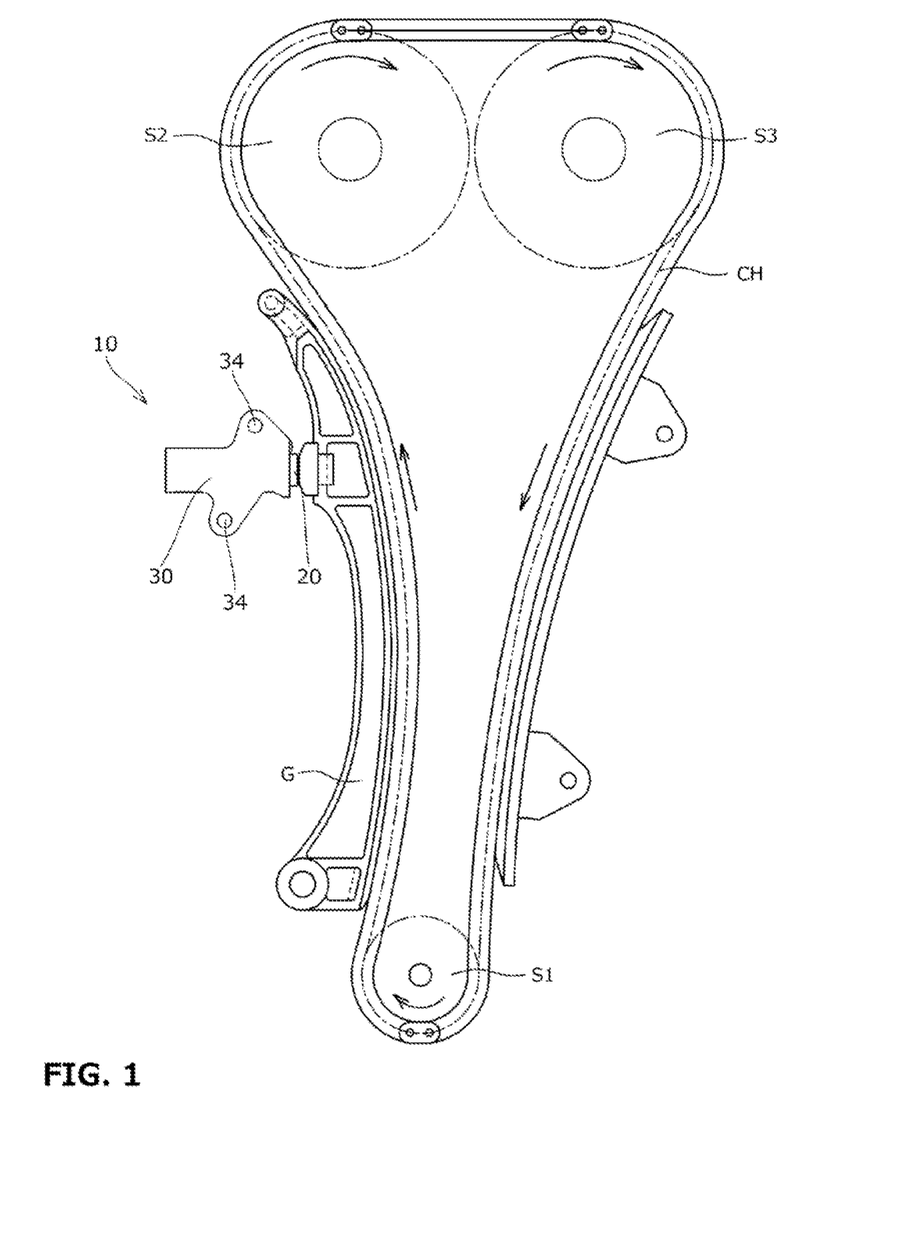
FIG. 1 is an illustrative diagram showing a timing system in which a tensioner according to one embodiment of the present invention is incorporated.

First, the tensioner 10 is incorporated in a chain transmission used in a timing system or the like of a car engine. As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 2:
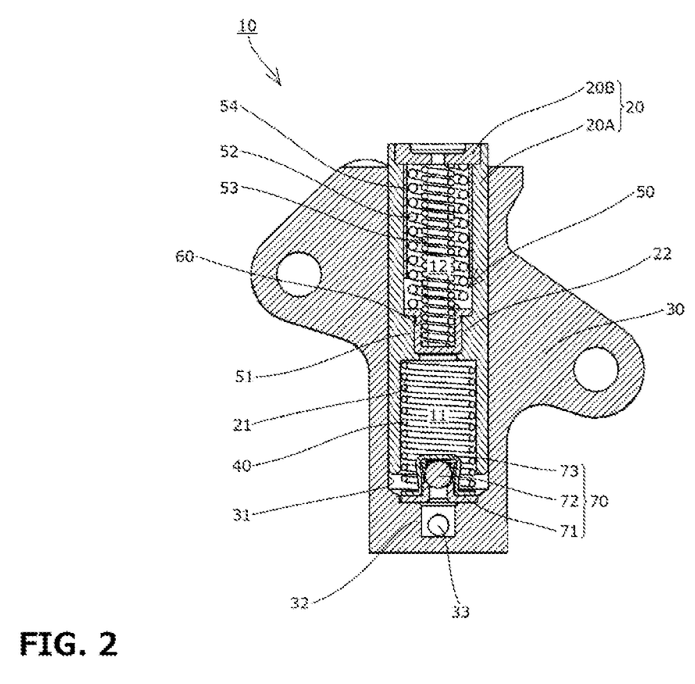
FIG. 2 is a cross-sectional view illustrating the tensioner.
Figure 3:
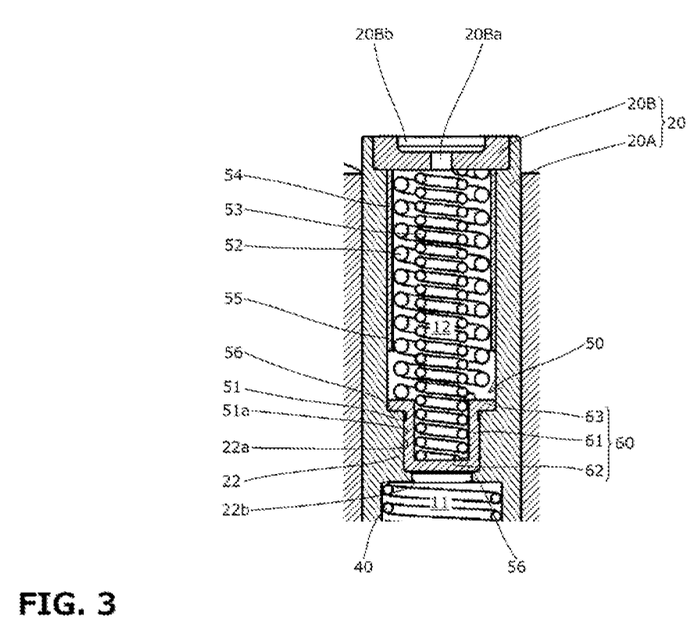
FIG. 3 is a cross-sectional view illustrating part of FIG. 2 to a larger scale.

The tensioner 10 includes, as shown in FIG. 2 and FIG. 3, a plunger 20 having a cylindrical plunger hole 21 that is open on a rear side, a housing 30 having a plunger accommodating hole 31 that is open on a front side and accommodates the plunger 20, a main spring (biasing unit) 40 accommodated inside an oil pressure chamber 11 that is formed between the plunger 20 and the plunger accommodating hole 31 so as to be able to expand and contract and to urge the plunger 20 toward the front side, a pressure adjusting mechanism 50 that adjusts the oil pressure in the oil pressure chamber 11, and a check valve unit 70 that allows oil to flow into the oil pressure chamber 11 and prevents the oil from flowing out of the oil pressure chamber 11.

Hereinafter, various constituent elements of the tensioner 10 will be described with reference to the drawings.

As shown in FIG. 2 and FIG. 3, the plunger 20 is made up of a cylindrical plunger body 20A having the plunger hole 21, and a cap member 20B attached to the front end of the plunger body 20A (more specifically, set inside a recess formed at the front end of the plunger body 20A), and inserted in the plunger accommodating hole 31 so as to be movable back and forth.

The plunger body 20A is made of metal such as iron, while the cap member 20B is made of synthetic resin or metal and the like.

The plunger body 20P is formed with an annular protrusion 22 that protrudes in a ring shape from an inner circumferential wall of the plunger hole 21 radially inward near the center in the longitudinal direction, as shown in FIG. 2 and FIG. 3.

Inside this annular protrusion 22 are formed a cylindrical large-diameter hole 22a open on the adjustment space 12 side, and a cylindrical small-diameter hole 22b open on the oil pressure chamber 11 side of the large-diameter hole 22a on the oil pressure chamber 11 side and communicating with the large-diameter hole 22a.

The cap member 20B is attached to the front end of the plunger body 20A and forms a bottom part at the front end of the plunger hole 21 as shown in FIG. 2 and FIG. 3. The cap member 20B is formed with an external relief hole 20Ba for communicating the adjustment space 12 with the outside of the plunger 20, and a recess 20Bb formed in the front end face of the cap member, as shown in FIG. 3. The external relief hole 20Ba need not necessarily be provided, but should preferably be there in respect of preventing an excessive buildup of oil pressure inside the adjustment space (low pressure chamber) 12 and for discharging air entrapped inside the oil pressure chamber 11 or adjustment space 12 to the outside.

The housing 30 includes, as shown in FIG. 1 and FIG. 2, the cylindrical plunger accommodating hole 31, a bottom part 32 formed on the rear side, an oil supply passage 33 in the form of a hole provided in the bottom part 32 to supply oil from outside to the oil pressure chamber 11, and a mounting part 34 for fixedly attaching the housing 30 to an engine block to which the tensioner 10 is to be attached.

The main spring 40 is accommodated in the oil pressure chamber 11 so as to be able to expand and contract as shown in FIG. 2. More specifically, one end of the spring abuts on the plunger body 20A (side face of the annular protrusion 22 on the oil pressure chamber 11 side) and the other end is arranged in contact with the check valve unit 70 (retainer 73).

Figure 4:
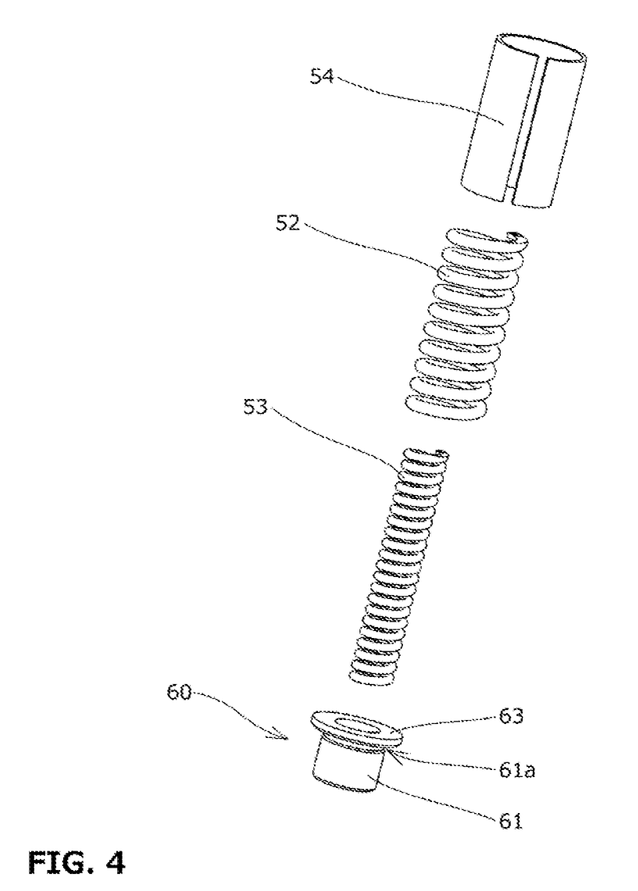
FIG. 4 is a perspective view illustrating various components of a pressure adjusting mechanism.

The pressure adjusting mechanism 50 adjusts the oil pressure in the oil pressure chamber 11 and includes, as shown in FIG. 2 to FIG. 4, a cylinder part 51 having a cylindrical cylinder inner circumferential surface 51a, a piston unit 60 set inside the cylinder part 51 such that it (or at least a part thereof) can approach and separate from the oil pressure chamber 11 and partitioning the space formed between the plunger 20 and the housing 30 into the oil pressure chamber 11 and the adjustment space 12, piston biasing units 52 and 53 that bias the piston unit 60 toward the oil pressure chamber 11, a first restricting part 55 that restricts the movement of the piston unit 60 toward the adjustment space 12 (front side), and a second restricting part 56 that restricts the movement of the piston unit 60 toward the oil pressure chamber 11 (rear side).

The cylinder part 51 is a section used for setting the piston unit 60 (or at least a part thereof) therein so as to be slidable back and forth.

In this embodiment, a portion of the plunger 20 in the front to back direction, more specifically, the inner circumferential wall of the large-diameter hole 22a of the annular protrusion 22 in the plunger 20, functions as the cylinder part 51 (cylinder inner circumferential surface 51a), as shown in FIG. 2 and FIG. 3.

The piston biasing units 52 and 53 are composed of a coil spring as a first piston spring 52, and a coil spring as a second piston spring 53 that is disposed radially inside the first piston spring 52, as shown in FIG. 2 and FIG. 3.

The first piston spring 52 is disposed inside the adjustment space 12, with one end (rear end) thereof abutting on a side face of a flange part 63 of the piston unit 60 on the adjustment space 12 side, and the other end (front end) thereof abutting on the bottom of the plunger 20 (cap member 20B), as shown in FIG. 2 and FIG. 3.

The second piston spring 53 is disposed inside the adjustment space 12, with one end (rear end) thereof inserted into the piston body 61 and abutting on a side face of a bottom part 62 of the piston unit 60 on the adjustment space 12 side, and the other end (front end) thereof abutting on the bottom of the plunger 20 (cap member 20B).

The first restricting part 55 is disposed on one side of the piston unit 60 on the adjustment space 12 side (front side) to restrict the movement of the piston unit 60 toward the adjustment space 12. In this embodiment, a restricting sleeve 54 arranged radially outside the first piston spring 52 functions as the first restricting part 55 as shown in FIG. 2 and FIG. 3. The restricting sleeve 54 is made of metal or synthetic resin and the like in a cylindrical form and has a slit along the longitudinal direction as shown in FIG. 4.

The second restricting part 56 is disposed on one side of the piston unit 60 on the oil pressure chamber 11 side (rear side) to restrict the movement of the piston unit 60 toward the oil pressure chamber 11. In this embodiment, as shown in FIG. 2 and FIG. 3, a stepped portion between the large-diameter hole 22a and the small-diameter hole 22b of the annular protrusion 22, located on one side of the bottom part 62 of the piston unit 60 on the oil pressure chamber 11 side, and a side face (front face) of the annular protrusion 22 on the adjustment space 12 side, located on one side of the flange part 63 of the piston unit 60 on the oil pressure chamber 11 side, function as the second restricting part 56.

The piston unit 60 is formed as a single component made of synthetic resin or metal and the like and including a tubular (cylindrical) piston body 61 set inside the cylinder part 51, the bottom part 62 formed on one end of the piston body 61 on the oil pressure chamber 11 side, and the flange part 63 formed on one end of the piston body 61 on the adjustment space 12 side, as shown in FIG. 2 and FIG. 3.

The piston body 61 is disposed inside the large-diameter hole 22a (cylinder part 51) as shown in FIG. 2 and FIG. 3. An annular groove 61a is formed in an outer circumferential surface of the piston body 61 at one end closer to the flange part 63 as shown in FIG. 4.

There is only a slight difference in diameter between the cylinder inner circumferential surface 51a and the outer circumferential surface of the piston body 61 (piston outer circumferential surface) such that a liquid tight seal condition is kept between the cylinder inner circumferential surface 51a and the outer circumferential surface of the piston body 61. Therefore, the oil is prevented from flowing through between the cylinder inner circumferential surface 51a and the outer circumferential surface of the piston body 61.

The bottom part 62 is formed so as to close the opening on one side of the piston body 61 on the oil pressure chamber 11 side.

The flange part 63 is formed to protrude from an outer circumferential surface of the piston body 61 on the adjustment space 12 side radially outward.

The check valve unit 70 is disposed at the bottom part 32 of the housing 30 as shown in FIG. 2, and allows the oil to flow in from the outside through the oil supply passage 33 into the oil pressure chamber 11, and prevents the oil from flowing out from the oil pressure chamber 11.

As shown in FIG. 2, the check valve unit 70 is made up of a ball seat 71 disposed in tight contact with the front face of the bottom part 32 of the housing 30, a spherical check ball 72 that can be seated on the ball seat 71 in tight contact therewith, and a retainer 73 arranged on the front side of the check ball 72 to restrict the movement of the check ball 72.

The check valve unit 70 may have any configuration as long as the unit allows the oil to flow into the oil pressure chamber 11 and prevents the oil from flowing out of the oil pressure chamber 11. A ball spring, for example, that biases the check ball 72 toward the ball seat 71, may be set between the check ball 72 and the retainer 73.

In normal operation of the tensioner 10 of this embodiment configured as described above, the piston unit 60 is biased by the piston biasing units 52 and 53 toward the oil pressure chamber 11 as shown in FIG. 2 so that the piston unit is pressed against the second restricting part 56 formed on the annular protrusion 22 of the plunger 20.

Figure 5:
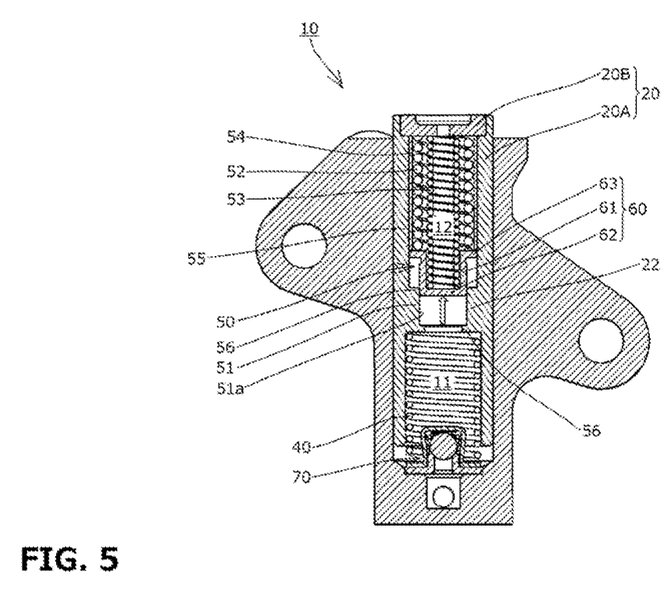
FIG. 5 is a cross-sectional view illustrating the tensioner when the oil pressure in the oil pressure chamber is increased.

When the oil pressure in the oil pressure chamber 11 builds up, the piston unit 60 is moved away from the oil pressure chamber 11 by the oil pressure from the oil pressure chamber 11 as shown in FIG. 5. As the volume of the oil pressure chamber 11 increases gradually in accordance with the moving amount of the piston unit 60, the pressing force of the plunger 20 applied to the drive chain CH can be gradually reduced. Thus the oil pressure in the oil pressure chamber 11 and the pressing force of the plunger 20 can be made stable with a simple structure.

As shown in FIG. 2 and FIG. 5, anywhere between the position where the piston unit 60 is closest to the oil pressure chamber 11 (and stopped from moving further by the second restricting part 56) and the position where the piston unit is closest to the adjustment space 12 (and stopped from moving further by the first restricting part 55), a liquid tight seal condition is kept between the cylinder part 51 and the piston unit 60. More specifically, a liquid tight seal condition is kept between the cylinder inner circumferential surface 51a and the outer circumferential surface of the piston body 61.

While one embodiment of the present invention has been described above in detail, the present invention is not limited to this embodiment and nay be carried out with various design changes without departing from the scope of the present invention set forth in the claims.

For example, while the tensioner 10 was described as a component to be incorporated in a timing system of a car engine in the embodiment above, the purpose of use of the tensioner 10 is not limited to this specific application.

Also, while the tensioner 10 was described as a component that applies tension to a drive chain CH with a tensioner lever G in the embodiment above, the plunger 20 can directly guide the drive chain CH slidably with a distal end thereof to apply tension to the drive chain CH.

The tensioner may not necessarily be applied to a transmission mechanism with a drive chain CH but can also be used for similar transmission mechanisms that use belts, ropes and the like, and can be applied in a variety of industrial fields where it is required to apply tension to an elongated component.

While the housing 30 accommodating the plunger 20 is described as the component known as a tensioner body that is attached to an engine block or the like in the embodiment described above, the housing 30 is not limited to the specific form described above and may be a cylindrical component known as a sleeve inserted into a body hole formed in the tensioner body.

In the embodiment described above, a liquid tight seal condition is kept between the cylinder inner circumferential surface 51a and the outer circumferential surface of the piston body 61 (piston outer circumferential surface) by setting a very small difference in diameter between the cylinder inner circumferential surface 51a and the outer circumferential surface of the piston body 61. The method of keeping a liquid tight seal condition is not limited to the one described above. For example, a sealing member such as a packing may be disposed between the cylinder inner circumferential surface 51a and the outer circumferential surface of the piston body 61 to keep a liquid tight seal condition.

The "liquid tight seal condition" referred to herein is not limited to complete blocking of oil flow between the cylinder inner circumferential surface 51a and the outer circumferential surface of the piston body 61 (piston outer circumferential surface) but also includes a seal that allows a very small amount of oil to flow between the cylinder inner circumferential surface 51a and the outer circumferential surface of the piston body 61.

While the piston biasing units 52 and 53 are described as being formed by two, first and second, piston springs 52 and 53 in the embodiment described above, the piston biasing units 52 and 53 are not limited to the specific form described above, and may be formed by three or more piston springs, for example.

While the first piston spring 52 is designed to have a larger spring coefficient than the second piston spring 53 in the embodiment described above, the piston springs 52 and 53 are not limited to the specific form described above, and both piston springs 52 and 53 may be a coil spring having the same spring coefficient, for example.

While the piston springs 52 and 53 are described to be each disposed in contact with the piston unit 60 and the bottom of the plunger 20 (cap member 20B) in the embodiment described above, the manner in which the piston springs 52 and 53 are set is not limited to the specific form described above. For example, the second piston spring 53 alone may be arranged to be in contact with both of the piston unit 60 and the bottom of the plunger 20 in a compressed state so as to apply pressure to the piston unit 60.

While the piston unit 60 is described as being a single component in the embodiment described above, the piston unit 60 is not limited to the specific form described above. For example, the piston unit 60 may be configured as a check valve that allows oil to flow to one direction but prevents the oil from flowing to the other direction.

While the cylinder part 51 is described as being formed to the plunger 20 in the embodiment described above, the cylinder part 51 is not limited to the specific form described above. For example, a recess or the like formed in the housing 30 may serve as the cylinder part 51.

In the embodiment described above, the piston unit 60 is restricted from moving toward the oil pressure chamber 11 or the adjustment space 12 by providing the first restricting part 55 and second restricting part 56. Alternatively, instead of providing these restricting parts 55 and 56, the position of the piston unit 60 may be controlled by adjusting the spring force (biasing force) of the main spring (main biasing unit) 40 and the piston biasing units 52 and 53.

What is claimed is:

1. A tensioner comprising: a plunger having a plunger hole that is open on a rear side; a housing having a plunger accommodating hole that is open on a front side and accommodates the plunger; a biasing unit accommodated inside an oil pressure chamber formed between the plunger and the plunger accommodating hole so as to be able to expand and contract and to urge the plunger toward the front side; and a pressure adjusting mechanism adjusting oil pressure in the oil pressure chamber, the pressure adjusting mechanism including a cylinder part, a piston unit set inside the cylinder part so as to be able to approach and separate from the oil pressure chamber and partitioning a space formed between the plunger and the housing into the oil pressure chamber and an adjustment space, and a piston biasing unit biasing the piston unit toward the oil pressure chamber, a liquid tight seal condition being kept between the cylinder part and the piston unit at any position between a position where the piston unit has moved closest to the oil pressure chamber and a position where the piston unit has moved closest to the adjustment space, and the piston biasing unit including at least two piston springs.

2. The tensioner according to claim 1, wherein the piston biasing unit includes a first piston spring, and a second piston spring disposed radially inside the first piston spring.

3. The tensioner according to claim 2, wherein the pressure adjusting mechanism includes a restricting sleeve disposed radially outside the first piston spring, and the restricting sleeve functions as a first restricting part that restricts movement of the piston unit toward the adjustment space.

4. The tensioner according to claim 2, wherein the piston unit is formed of a component having a tubular piston body set inside the cylinder part, a bottom part formed at one end of the piston body on the oil pressure chamber side, and a flange part formed at one end of the piston body on the adjustment space side, the first piston spring is arranged to abut on a side face of the flange part on the adjustment space side, and the second piston spring is arranged such that one end thereof is inserted in the piston body to abut on a side face of the bottom part on the adjustment space side.

5. The tensioner according to claim 4, wherein the plunger includes an annular protrusion protruding from an inner circumferential wall of the plunger hole radially inward, the annular protrusion includes a large-diameter hole open on the adjustment space side, and a small-diameter hole open on the oil pressure chamber side of the large-diameter hole and formed to communicate with the large-diameter hole, the piston body is arranged inside the large-diameter hole, an inner circumferential surface of the large-diameter hole functions as a cylinder inner circumferential surface of the cylinder part, a stepped portion between the large-diameter hole and the small-diameter hole functions as a restricting part positioned at the bottom part on the oil pressure chamber side to restrict movement of the piston unit, and a side face of the annular protrusion on the adjustment space side functions as a restricting part positioned at the flange part on the oil pressure chamber side to restrict movement of the piston unit.

* * * * *